United States Patent

[11] 3,607,154

[72] Inventors Donald L. White
Bethesda;
Ernest B. Donaldson, Suitland, Md.;
Arthur J. Middleton, Cleveland, Ohio
[21] Appl. No. 874,471
[22] Filed Nov. 6, 1969
[45] Patented Sept. 21, 1971
[73] Assignee Washington Gas Light Company
Washington, D.C.

[54] REFRACTORY BED FOR GAS MACHINE AND PROCESS FOR PRODUCING OIL GAS
6 Claims, 3 Drawing Figs.

[52] U.S. Cl. .................................................. 48/102 R,
48/211, 48/212
[51] Int. Cl. ...................................................... C10g 11/28
[50] Field of Search .......................................... 48/102, 75,
211, 214, 106, 212, 213

[56] References Cited
UNITED STATES PATENTS
2,071,285 2/1937 Johnson ........................ 48/211
2,663,625 12/1953 Born .............................. 48/211 X
2,721,122 10/1955 Pettyjohn et al. ............. 48/211
2,730,437 1/1956 Coome .......................... 48/211 X
2,893,853 7/1959 Milbourne .................... 48/211

Primary Examiner—Morris O. Wolk
Assistant Examiner—R. E. Serwin
Attorney—Mason, Fenwick & Lawrence ABSTRACT: An apparatus and process for producing a combustible oil gas as a supplement to heating gas from a gas generator comprising a bed of curved elongated refractory bodies composed of silicon carbide material having a high thermal conductivity superimposed upon a layer of refractory grid tile capable of withstanding over 3,000° F., the bed being of a thickness of 0.05–0.5 times the diameter of the shell of the gas generator containing the refractory bed, each body having a curved surface with a diameter between 0.5 to 0.08 times the bed thickness and a length approximately 0.2 to 1.0 times the bed thickness, the bed being directly exposed to form the bottom of a combustion chamber within the gas machine so as to absorb thermal shock and to preserve the conventional refractory brick tile from fusing and spalling and restricting the flow of gas through the refractory bed as well as to maintain a rapid heating oil ignition to avoid explosions within the refractory bed.

INVENTORS
DONALD L. WHITE,
ARTHUR J. MIDDLETON &
ERNEST B. DONALDSON
BY
Mason, Fenwick & Lawrence
ATTORNEYS

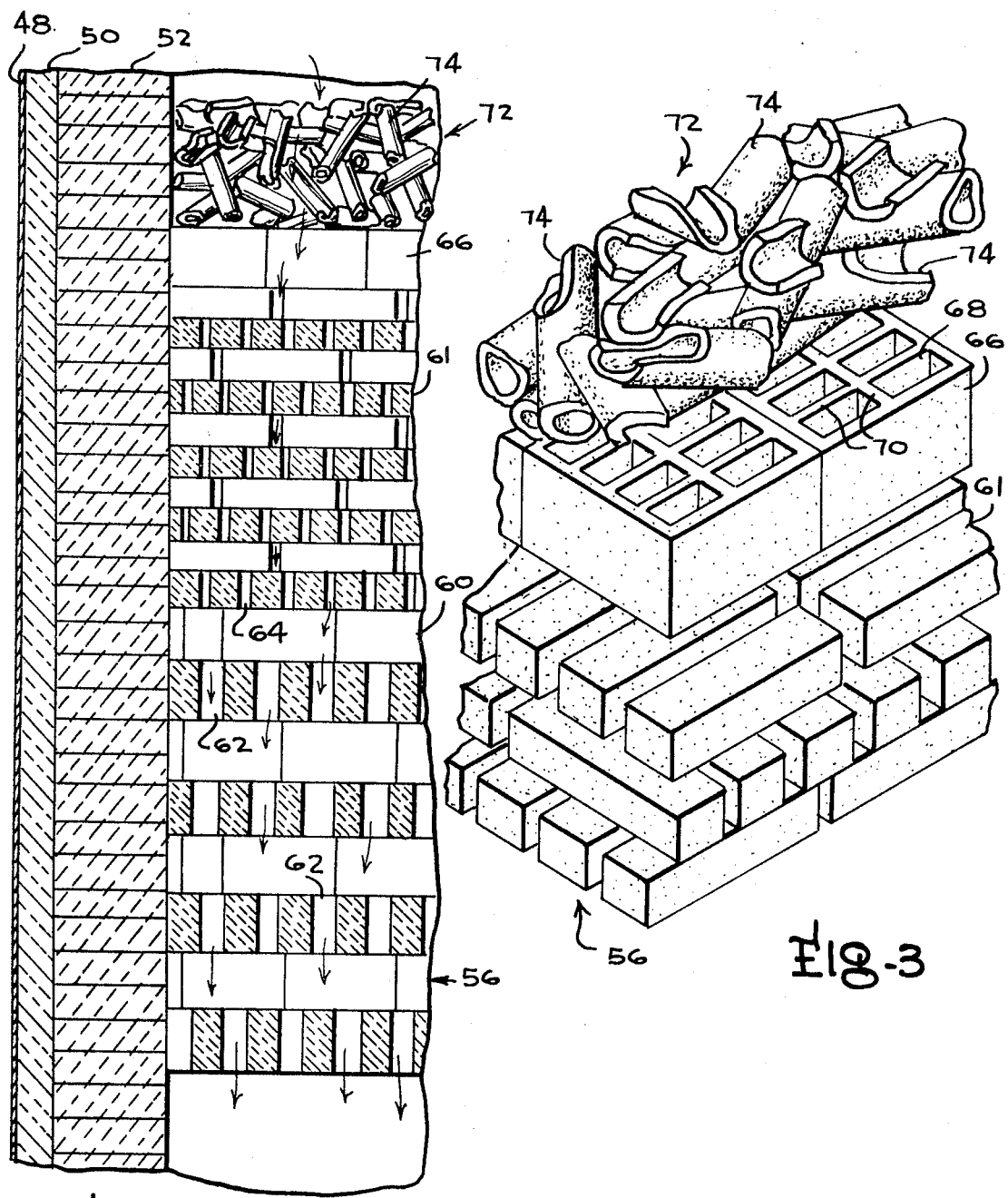

REFRACTORY BED FOR GAS MACHINE AND PROCESS FOR PRODUCING OIL GAS

This invention relates generally to an apparatus and process for producing combustible gas for fuel. More particularly, the present invention relates to a gas machine and a process for the production of a combustible gas from fuel oil with minimum thermal shock and degradation of the refractory brick in a gas generator.

It is conventional for gas utility companies in areas of relatively cold winters to protect against shortage of available heating gas through the production of a high B.t.u. oil gas from fuel oil. Such a high heating value gas is obtained by pyrolysis of the fuel oil and augments the capability of the gas utility company to provide continuous service during peak periods.

The apparatus that produces such high B.t.u. oil gas from fuel oil is generally referred to as a gas generator. This generator is usually provided with a refractory lined interior and a refractory bed arrangement in the form of a checker work having flues or passages therethrough to provide for the flow of the oil gas produced. It is also conventional that the refractory bed is heated by means of burning a fuel oil in the presence of air in a combustion chamber to heat the refractory bed to temperatures that may be in excess of 3500° F. After purging the gas machine with steam, atomized fuel oil is injected directly onto this preheated refractory bed whereby the fuel oil is cracked to produce a gas having a heating value that may range between 1100 and 1300 B.t.u. The final heating value will depend upon a number of factors such as the temperature, initial composition of the fuel oil and the amount of steam present.

Since the process is generally employed as a means of generating a supplementing gas during peak requirements, operations are generally conducted during cold weather when the oil temperature may be near the freezing point of water. This cold oil is what is atomized and in the presence of steam is the composition that is cracked to produce the oil gas.

This drastic change in temperature from the extremely high heat content of the refractory bed at the time of combustion down to the impingement on the refractory material of the cold oil causes an intensive thermal shock upon the refractory material. With the alternation of the great heat of combustion and the cool oil at relatively high frequency which is approximately every 3 minutes for a complete cycle, the refractory materials and the checker work arrangement suffers grave loss of efficiency within a relatively short period of time. Experience has demonstrated that the refractory material in the bed as well as on the wall of the gas generator will spall and crack and after some period of time break up into small chunks which normally sift down to the refractory bed causing serious interference with the flow of gases through the gas machine.

If the degradation of the refractory material is recognized in time, replacement of the top layers of the refractory material which usually may be a high quality firebrick may be replaced. However, the only approach remaining to retrieve the articles of refractory material that may have fallen into the passages in the brick checkerwork is to remove and replace the entire refractory bed. This is, in the experience of every gas producer, a very laborious and expensive operation but one which allows no alternative course.

Another cause of the degradation and breakup of refractory material is also due to the cycling of the heating phase and the cracking or pyrolysis phase. It is found, for instance, that at the conclusion of the pyrolysis it is necessary to admit steam to purge the fuel oil vapors prior to admitting the air and atomized fuel oil for the combustion cycle. During this quite short time period for the steam purge, the refractory material taking part in the pyrolysis or contacting the fuel oil must recover at its outer portion a temperature necessary for combustion of the about-to-be-entered heating oil. But this recovery can only be achieved through the heat of the inner regions of the refractory with adequate time. The heating oil is obviously to be ignited by those refractory firebricks at the proper oil ignition temperature but because of the cooling effect on these firebricks due to the impingement of the cold oil and the shortness of the time interval of recovery allowed the level in the refractory firebricks at which a sufficiently high surface temperature exists to ignite the incoming heating oil or combustion is undesirably below the top. The dropping of the level capable of igniting the heating oil necessitates the heating oil passing farther downwardly into the lower level of the refractory bricks until ignition occurs. This delay in ignition of the mixture and ignition in the lower portion of the bed will cause an explosion within the combustion chamber and within the refractory material. Manifestly, this explosion will add substantially to the breakup of the refractory or at least would disturb or disarrange the checkerwork of the firebrick in both the generator and the adjacent super heater to such an extent that extensive repair is usually required.

It was found that the short period of time existing for the steam purge following the pyrolysis is not adequate with the arrangement of materials used in the conventional gas machines to maintain the proper level of ignition capability on or closely adjacent to the top of the refractory bed nor could the time be lengthened without a substantial loss of production. Primarily, it has now been found that this delay is due to the use of low thermal conductivity material for the refractory bed which necessarily requires a long time for the hotter and lower interior of the refractory bricks of the bed to transfer heat to the cooler outer regions.

It is therefore an object of the present invention to prolong the life of the conventional firebrick material obviating the necessity for frequent extensive repairs and replacement due to degradation of the firebrick by spalling and cracking.

It is also an object of this invention to provide a process and gas machine apparatus wherein the ignition capability of the refractory materials will be maintained at a higher level so as to prevent explosions of the combustion mixture within the refractory.

A further object of the present invention is a process and gas machine apparatus where spalling of the refractory material which might clog the passages between the checkerwork of the firebrick will be held to a minimum.

Another object of this invention is to utilize a bed of curved shapes and of silicon carbide material to effect both a rapid ignition and a reduction in the thermal shock.

These and other objects of the present invention will be manifest upon careful consideration of the following specification and accompanying drawings wherein:

FIG. 2 is an enlarged sectional view of the refractory bed of the generator of FIG. 1, illustrating the composition of the refractory bed and the checkerwork arrangement forming the gas passages.

FIG. 3 is a enlarged exploded view in perspective of the firebrick grid tile and the silicon carbide screen or bed of curved elongated refractory bodies.

Figure 1:
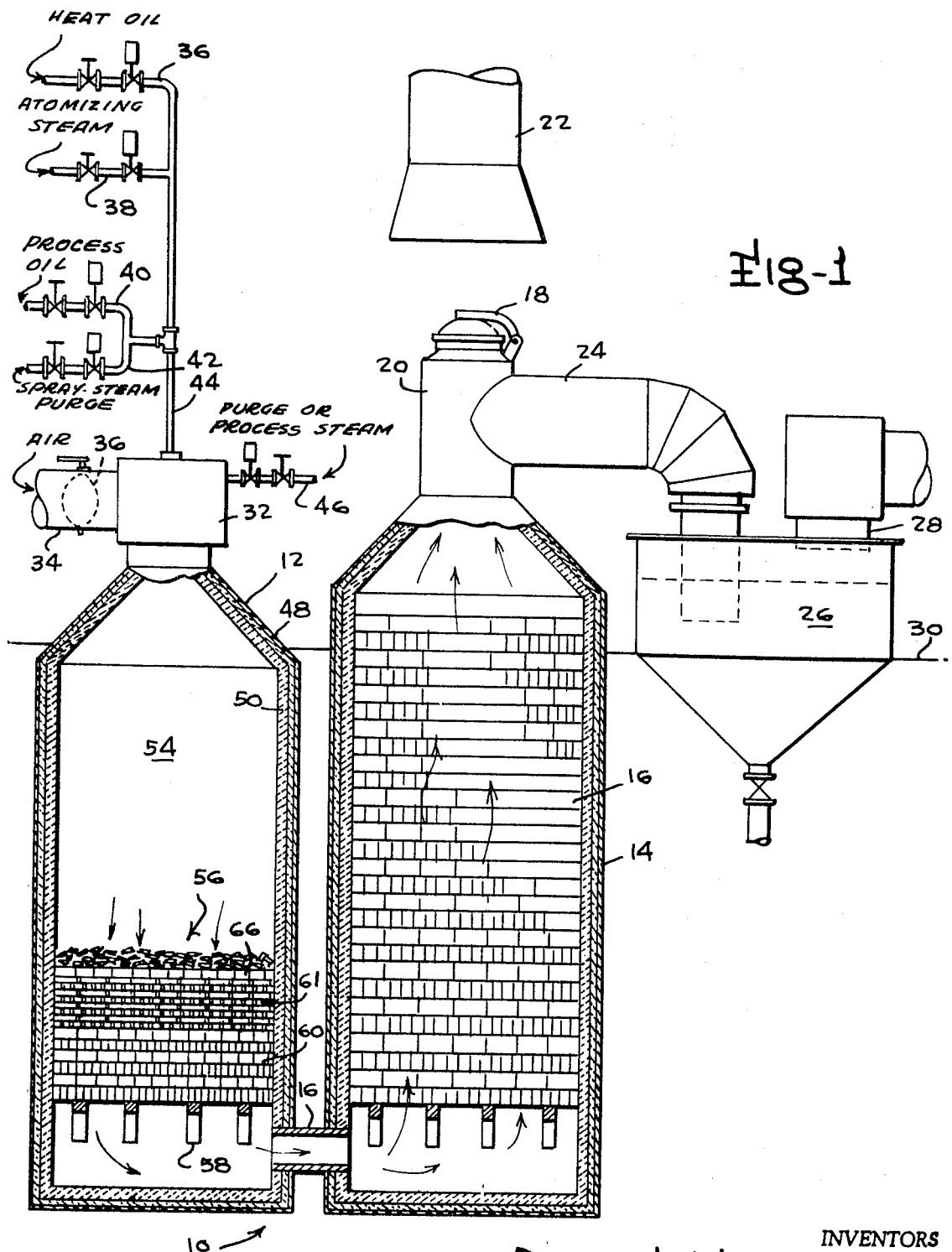
FIG. 1 is an elevational view partly in section and partly broken away illustrating the generator of the gas machine and the super heater for producing a high B.t.u. oil gas.

In the drawings FIGS. 1 illustrates the apparatus of the present invention and is conventional except for the grid refractory bed. Specifically the numeral 10 refers to the composite gas machine composed of a gas generator 12 and a super heater 14 in fluid communication at their base by means of conduit 16. The super heater 14 includes conventional firebrick checker work 16 provided with conventional passages as illustrated by the flow arrows superimposed upon the checker work of the super heater. A stack valve 18 caps the stack 20 and is opened only to the outlet chimney 22. As is conventional, the super heater has connected to the stack 20 a flow pipe 24 leading to a wash box 26 wherein the exiting oil gas is scrubbed in an conventional manner. Outlet conduit 28 leads to a gas holder tank not shown. Above the operating floor shown at 30 and above the gas generator 12 is the flow head 32 which is in communication with air pipe 34 provided with a suitable damper 36. As is clearly labeled in FIG. 1, feed pipes 36, 38, 40 and 42 respectively deliver the heating fuel air for combustion, atomizing steam, process oil which may be a number two fuel oil and a spray steam purge all through the delivery pipe 44. The purging or process steam is admitted into the flow head 32 by steam pipe 46 all in the conventional manner.

The construction of the gas generator is the area wherein the present invention lies and is best shown in FIGS. 2 and 3 taken in conjunction with FIG. 1. The gas generator is formed from an upright steel shell 48 that is insulated with an asbestos lagging at 50 adjacent to which is provided a lining of refractory bricks 52 which may be the conventional firebricks.

The upper zone of the interior of the gas generator constitutes a combustion chamber 54 while in the lower portion the refractory material of several different layers is generally referred to at 56. The refractory material 56 is supported in a conventional manner at 58.

As best illustrated in FIG. 2, the refractory material 56 may be formed of a plurality of courses of firebrick 60 which may constitute the lower 8 levels as shown in FIG. 2. The number of courses of such firebrick of course is not critical nor is the checkerwork arrangement which may be such that the firebrick is of a conventional size 9 inches by 4½ inches by 2½ inches are laid butted on ends and spaced 2 inches on sides to provide the passages 62 above the firebrick. There may be additional firebrick or courses of silicon carbide soaps of the same size but spaced preferably although not essentially three-fourths inch on the ends and sides to provide passages 64.

On the top of these bricks or soaps 61 is to be placed a single course of grid tiles 66 which are provided with apertures 68 having an axis parallel to the major axis of the gas generator. The size of the grid tile is not critical; it may have median dimensions such as 8 inches square by 4 inches in height with an aperture varying between 1½ inches and 3 inches the width 70 may have dimensions of approximately three-eights inch. It is possible for the outside dimensions of the grid tile to be as large as 2 feet square and the height from 8 inches to 12 inches. The maximum aperture size is not critical and may vary from 1 inch minimum dimension to a length of 6 inches. The shape of the aperture is not critical; however, it obviously must be smaller in dimension than the superimposed silicon carbide refractory material forming the screen or bed 72.

The formation of the screen or bed 72 is an aspect of significant importance in the success of the present invention. In the initial stages of development it was found that the thermal shock was to some extent alleviated if flat faces of broken silicon carbide brick were used to form a screen. However, there developed because of the use of the relatively flat or non-curved faces of the silicon carbide brick a blockage due to a complementary fit between the flat faces over the passages. During the heating cycle, the broken carbide brick would be expanded due to the temperature rise and cause a substantial back pressure to block the apertures and the flow path of the gases through the refractory bed.

It has now been discovered that the shape of the refractory bodies 74 was quite important in order to achieve the free flow of gases through the gas generator and that the curved elongated refractory bodies of silicon carbide material that may, for instance, be formed from fragmented tubular pipe of several inches to a foot or more outside diameter are ideal to absorb the thermal shock and also to permit the flow of gases through the bed.

The formation of the bed for screen 72 has been found to be best determined as a function of the shell diameter and should be the thickness of the bed between approximately 0.05 to 0.5 times the shell diameter and preferably 0.05 to 0.2 times the shell diameter. It has been discovered also that the outside curvature of the individual refractory bodies 72 should have a diameter between 0.5 and 0.08 times the thickness of the bed. The length of the curved surface in at least one direction should be between 0.2 to 1.0 times the bed thickness. Preferably for a shell diameter of 10 feet, the bed thickness may vary from 1.0 to 5 feet. For the refractory bodies the curved surface in the form of fragmented tubes may be 6 to 8 inches outside diameter and the length of the fragmented piece may range from 1 foot to 5 feet.

It has been found that the individual refractory bodies 74 are preferably in the form of fragmented tubular pipe formed from silicon carbide. In tests that have been conducted to determine the efficiency of the present refractory bed it has been found that the gas flow through the bed having the curved elongated refractory bodies 74 is significantly higher than the use of fragmented silicon carbide bricks.

It also has been determined that the use of the high thermal conductivity silicon carbide curved elongated refractory bodies will absorb the thermal shock far more effectively than the conventional firebricks and, more importantly, will be effective to raise the level of the oil ignition temperature effective to bring about ignition during the steam purge so that the possibility of explosion is substantially reduced. With the use of the refractory screen of silicon carbide and the resulting reduction in the thermal shock, fusion of the refractory bodies and fragmentation due to spalling and cracking are held to a minimum. Any spalling or cracking of the refractory lining 52 above the combustion chamber is held and remains upon the screen 72 which continues to effect the necessary heat exchange during the steam purge without creating any undue back pressure. Due to the curved shape of the refractory bodies 74, free flow occurs.

The grid tile 66 acts as a support medium having definite dimensions and forms a solid base so that a flat uniform platform in the form of the screen 72 may be formed having a known and invariable permeability obtained from the length of each refractory body 74, its diameter and the thickness of the bed 72.

Any of the materials caught upon the silicon carbide screen that may have been dislodged from the refractory lining 52 may be easily removed from the top of the screen 72 with very minor cost and effort and would be a simple matter of routine maintenance for the gas generator.

In operation, air and heating oil is admitted to the combustion chamber to ignite in the upper levels of the refractory bed. After the combustion which heats the refractory to a temperature above 3000° F, a steam purge is effected to rid the combustion chamber of the products of combustion. Fuel oil and steam are deposited onto the refractory bed 72 whereby a pyrolysis and cracking of the fuel oil takes place in the known manner to produce the high B.t.u. oil gas. All of the oil gas is purged by steam and it is at this time that the buffer of fragmented high thermal conductivity tubular refractory bodies having curved elongated shapes come into play to conduct the heat to the outer surface of each body from the inner portions thereof to raise the position of the ignition temperature to a point at the surface of the bed 72 wherein explosions will not occur. Then, when the heat oil is directed into the combustion chamber for combustion there will be no undesirable thermal shock or explosion which would be detrimental to the refractory bricks. The frequency of the cycle varies in time and is not critical to the operation of the present invention but usually full cycle will require about 3 minutes.

It is also one of the important benefits of the present invention that due to the rapid ignition at the upper level of the refractory bed that improved ignition of the fuel air mixture is obtained which reduces substantially the smoke emission from the gas machine. This is a most important benefit in order to meet the present day designs to reduce any air pollution.

The most significant benefit however of the present invention is the extension of the refractory life and the major reduction in maintenance costs.

From the foregoing detailed description it will be evident that there are a number of changes, adaptations and modifications of the present invention which will come within the province of those skilled in the art; however, it is intended that all such variations not departing from the spirit of the invention be considered as within the scope thereof as limited solely by the appended claims.

We claim:

1. A gas machine apparatus for producing combustible gas from fuel oil comprising:
- an elongated hollow shell forming a generator, a refractory lining within said shell,
- a combustion chamber for burning a heating oil in the upper portion of said generator,
- an inlet and outlet to said generator in the upper and lower portion respectively,
- a plurality of layers of firebrick supported in the lower portion of said generator above said outlet and immediately below said combustion chamber,
- said firebrick being positioned to provide a plurality of passages between said brick communicating with said inlet and outlet,
- a layer of refractory grid tile capable of withstanding temperatures over 3000° F superimposed upon said firebrick,
- said tile having a plurality of through apertures communicating with said passages,
- a bed of curved elongated refractory bodies composed of silicon carbide material having a high thermal conductivity superimposed on said tile,
- said bed being of a thickness of 0.05–0.5 times the shell diameter,
- each said body having a curved surface with a diameter between 0.5 to 0.08 times the bed thickness and a length approximately 0.2–1.0 times the bed thickness and being of greater size than the diameter of each said aperture,
- said bed being directly exposed to and forming the bottom of said combustion chamber whereby to absorb thermal shock to preserve the said tile and brick from fusing and spalling and said bodies maintaining an oil ignition temperature level as close to the surface of each said body adjacent to the combustion chamber as is possible to effect rapid ignition of said fuel oil.

2. The apparatus of claim 1, wherein said refractory bodies are in the form of fragmented tubes.

3. The apparatus of claim 1, wherein the thickness of the bed ranges from 0.05 to 0.2 times the shell diameter.

4. The apparatus of claim 1, wherein said grid tile is provided with a plurality of apertures having an axis parallel to the major axis of the shell.

5. The apparatus of claim 1, wherein the retracted bodies are fragmented tubes and said bed is of a thickness between 0.05 and 0.5 times the shell diameter.

6. The process of producing combustible gas from fuel oil in a gas machine having a refractory bed comprising:
- alternately combusting an oil to heat said refractory bed to a temperature above 3000° F and depositing fuel oil onto said bed to crack said fuel oil into combustible gases,
- providing a buffer of fragmented high thermal conductivity tubular refractory bodies on the upper level of said bed,
- withdrawing heat from the interior of each said body subsequent to the cracking of said fuel oil to raise the surface temperature of said bodies to the level capable of producing combustion,
- combusting fuel oil at said level to reduce the thermal shock of said combustion.